(12) United States Patent
Toya et al.

(10) Patent No.: US 7,679,312 B2
(45) Date of Patent: Mar. 16, 2010

(54) SOLAR CHARGER

(75) Inventors: Shoichi Toya, Minamiawaji (JP); Koichi Fukukawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 149 days.

(21) Appl. No.: 11/907,693

(22) Filed: Oct. 16, 2007

(65) Prior Publication Data
US 2008/0297106 A1 Dec. 4, 2008

(30) Foreign Application Priority Data
Oct. 17, 2006 (JP) .............................. 2006-282382

(51) Int. Cl.
*H01M 10/44* (2006.01)
*H02J 7/00* (2006.01)

(52) U.S. Cl. .................. 320/101; 320/107; 320/113
(58) Field of Classification Search ................ 320/101, 320/103; 323/906
See application file for complete search history.

(56) References Cited

U.S. PATENT DOCUMENTS 6,404,168 B1 * 6/2002 Shoji ........................ 320/134

| | | | |
|---|---|---|---|
| 7,385,374 B2 * | 6/2008 | Frantz et al. ................ | 320/138 |
| 2002/0190688 A1 * | 12/2002 | Alsina ........................ | 320/101 |
| 2006/0214630 A1 * | 9/2006 | Huang ........................ | 320/112 |
| 2007/0075676 A1 * | 4/2007 | Novak ........................ | 320/101 |
| 2007/0236180 A1 * | 10/2007 | Rodgers ..................... | 320/115 |

FOREIGN PATENT DOCUMENTS

JP 63-19770 2/1988

* cited by examiner

*Primary Examiner*—Edward Tso
*Assistant Examiner*—Ahmed Omar
(74) *Attorney, Agent, or Firm*—Wenderoth, Lind & Ponack, L.L.P.

(57) ABSTRACT

The solar charger is provided with a case 1 that can hold a rechargeable battery 5 in a removable fashion, and a solar cell 4 to supply charging power to the rechargeable battery 5 loaded in the case 1. The case 1 is formed in a shape having a bottom surface 2 and at least two tapered surfaces 3 with different slope angles α with respect to the bottom surface 2, and the solar cell is disposed on the bottom surface 2. The angle of inclination θ of the solar cell 4 provided on the bottom surface 2 of the solar charger is changed by disposing a tapered surface 3 having a different slope angle α on a flat surface.

22 Claims, 11 Drawing Sheets

SOLAR CHARGER

BACKGROUND OF THE INVENTION

1. Field of the Invention

This invention relates to a solar charger that charges a rechargeable battery via a solar cell, and in particular relates to a solar charger that can efficiently charge a rechargeable battery over the four seasons of the year.

2. Description of the Related Art

Solar cells produce electricity most efficiently when oriented perpendicular to the sun's rays. This is because solar energy is most efficiently transferred to solar cells irradiated in this orientation. The sun's rays irradiate solar cells with energy of approximately 1 KW per square meter. Consequently, solar cells with an energy conversion efficiency of 10% generate 100 W of electricity per square meter. However, if the solar cells are inclined at an angle of 45° with respect to the sun's rays, solar energy supplied to the solar cells drops by 30%. If the solar cells are further inclined to an angle of 60°, solar energy supplied to the solar cells drops to one half. This shows how important orienting solar cells perpendicular the sun's rays is for efficiently charging rechargeable batteries via solar cells.

To efficiently charge rechargeable batteries via solar cells, the present applicant developed a solar charger that can change the angle of inclination of the solar cells (refer to Japanese Patent Application Disclosure SHO 63-19770 [1988]).

SUMMARY OF THE INVENTION

As shown in FIG. 1, the solar charger that is cited in patent disclosure SHO 63-19770 has a case 91 with a cylindrical shape and a plurality of grooves 92 or flat surfaces, which are provided in the cylindrical outer surface. In this solar charger, the angle of inclination of the solar cells 94 can be changed by changing the groove 92 or flat (surface) that rests on a horizontal supporting surface. However, because a solar charger with this configuration has an overall cylindrical shape, it has the drawback that it cannot stably hold a set angle of inclination when set with a groove or flat resting on the horizontal surface. As a result, it has the drawback that if, for example, the supporting surface vibrates or there is a slight jolt, the angle of inclination changes and rechargeable batteries cannot be efficiently charged. In particular, if many grooves or flats are provided to allow placement in accordance with the sun's angle of elevation, which changes over the four seasons, the pitch of the grooves becomes narrower and stable placement becomes even more difficult.

The present invention was developed to further address these drawbacks. Thus, it is a primary object of the present invention to provide a solar charger that can be stably placed to follow the changing angle of elevation of the sun and efficiently charge a rechargeable battery via a solar cell.

The solar charger of the present invention is provided with the following structure to realize the object described above. The solar charger is provided with a case 1, 21, 41 that can hold a rechargeable battery 5 in a removable fashion, and a solar cell 4 to supply power to charge the rechargeable battery 5 mounted in the case 1, 21 41. The case 1, 21, 41 is formed with a shape that has a bottom surface 2, 22, 42, and at least two tapered surfaces 3, 23, 43 having different slope angles ($\alpha$) with respect to the bottom surface 2, 22, 42. The solar cell 4 is disposed on the bottom surface 2, 22, 42. The angle of inclination ($\theta$) of the solar cell 4 provided on the bottom surface 2, 22, 42 of the solar charger is changed by placing tapered surfaces 3, 23, 43 with different slope angles ($\alpha$) on a planar surface.

The solar charger described above achieves the characteristic of stable placement in accordance with the sun's angle of elevation, which changes over the four seasons, allowing efficient rechargeable battery charging via the solar cell. This is a result of disposing the solar cell in the bottom surface of the case of the solar charger, and having at least two tapered surfaces with different slope angles ($\alpha$) with respect to the bottom surface. This solar charger can be placed on a planar surface via tapered surfaces, which have different slope angles ($\alpha$). This changes the angle of inclination of the solar cell provided on the bottom surface and allows the sun's rays to shine perpendicular to the solar cell. Consequently, the solar cell can be disposed in an ideal orientation in accordance with the sun's various changing angles of elevation. In addition, stable case placement is made possible by disposing a tapered surface on a planar surface.

The overall shape of the case 1 of the solar charger of the present invention can be that of a pyramid formed by a polygonal bottom surface 2 having a plurality of tapered surfaces 3 at its perimeter.

Since the overall shape of the case of the solar charger above is a pyramid having a plurality of tapered surfaces at the perimeter of the bottom surface, the solar charger has the characteristic that the tapered surfaces can be wide and large, allowing stable placement on a horizontal supporting surface.

The overall shape of the case 1 of the solar charger of the present invention can be that of a pyramid with a bottom surface and four sides.

Since the overall shape of the case of the solar charger above is that of a pyramid with a bottom surface and four sides, each tapered surface can be made wide to allow more stable placement on a horizontal supporting surface. In particular, since this case can have four tapered surfaces, it can be placed in accordance with the sun's angle of elevation in summer, winter, and spring and fall.

The case 1, 21, 41 of the solar charger of the present invention can be provided with a rechargeable battery 5 compartment 6, 26, 46 in the vertex region away from the bottom surface 2. In the present application, as shown in FIGS. 5 and 7 with the bottom surface oriented below, the vertex region of the case refers to the upper region of the case.

Since the solar charger above is provided with a rechargeable battery compartment in the vertex region of the case, which is away from the bottom surface, it has the characteristic that it can be placed in a particularly stable fashion. This is because when the case is placed on a horizontal supporting surface, a heavy rechargeable battery is disposed in the vertex region of the case opposite the solar cell. In particular, with any of the tapered surfaces, which have different slope angles ($\alpha$), resting on the horizontal supporting surface, the center of gravity is lowered by the heavy rechargeable battery in the vertex region opposite the solar cell.

The vertex region of the case 1, 21, 41 of the solar charger of the present invention can be cut in a planar fashion (truncated) to open the rechargeable battery 5 compartment 6, 26, 46. This opening can be closed off via a removable cap 7, 27, 47 and the removable cap 7, 27, 47 can have a shape that is coplanar with the tapered surfaces 3, 23, 43.

The vertex region of the case of the solar charger above is truncated to open the rechargeable battery compartment, and a removable cap closes off this opening and has a shape that is coplanar with the tapered surfaces. Therefore, in a solar charger with this configuration, a rechargeable battery can be easily loaded and removed, and with the removable cap in place, the solar charger can be set on a horizontal supporting surface in a stable fashion via the removable cap and a tapered surface.

The case 1, 41 of the solar charger of the present invention can have a summer tapered surface 3A, 43A with a solar cell angle of inclination for summer, a winter tapered surface 3B, 43B with a solar cell angle of inclination for winter, and a spring and fall tapered surface 3C, 43C with a solar cell angle of inclination for spring and fall.

Further, since the solar charger above is provided with a summer tapered surface, a winter tapered surface, and a spring and fall tapered surface, it can efficiently charge a heavy rechargeable battery by adjusting the angle of inclination of the solar cell to an optimum angle according to the four seasons of the year.

The solar charger of the present invention can be provided with an internal battery 12 that is inside the case 1 and is charged by the solar cell 4. The heavy rechargeable battery 5 can be charged via this internal battery 12.

Further, since the case of the solar charger above contains an internal battery, which is charged by the solar cell, and can charge the rechargeable battery, wasted energy can be avoided by storing solar cell power in the internal battery when no rechargeable battery is loaded or when a rechargeable battery is fully charged. In addition, when charging the rechargeable battery loaded in the solar charger, both the solar cell and the internal battery can charge the rechargeable battery to attain full charge in a short period. Finally, even when no output is obtained from the solar cell, the rechargeable battery can be charged via the internal battery.

The above and further objects and features of the invention will more fully be apparent from the following detailed description with accompanying drawings.

DETAILED DESCRIPTION OF THE PREFERRED EMBODIMENT(S)

Figure 1:
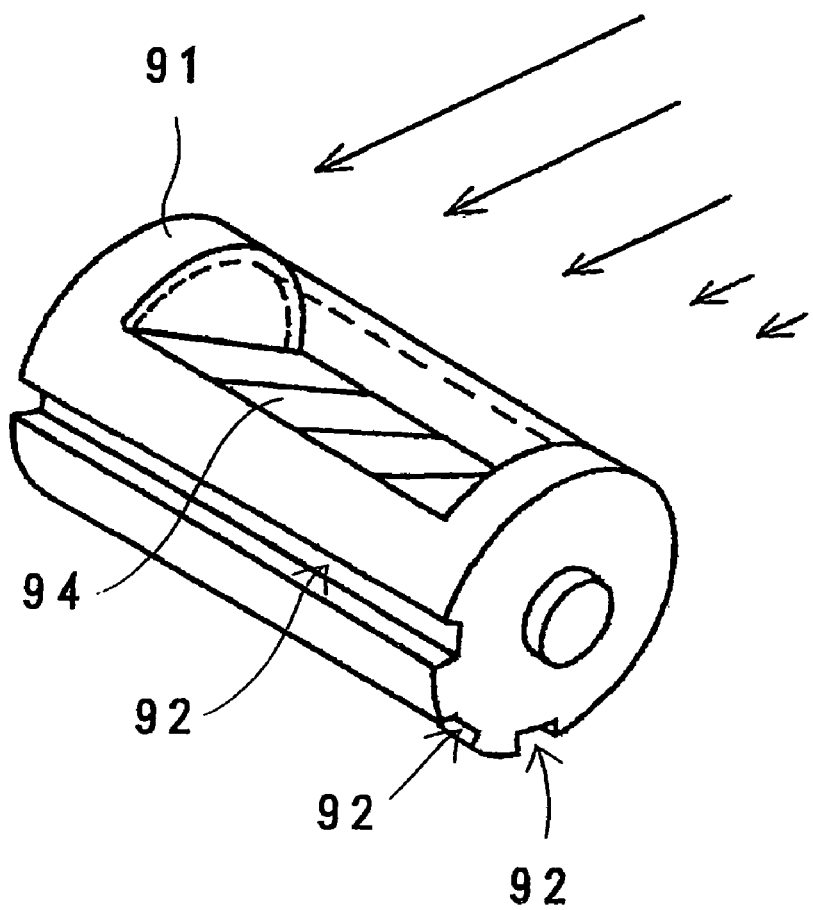
FIG. 1 is an oblique view of a solar charger from a previous patent application by the present applicant.
Figure 2:
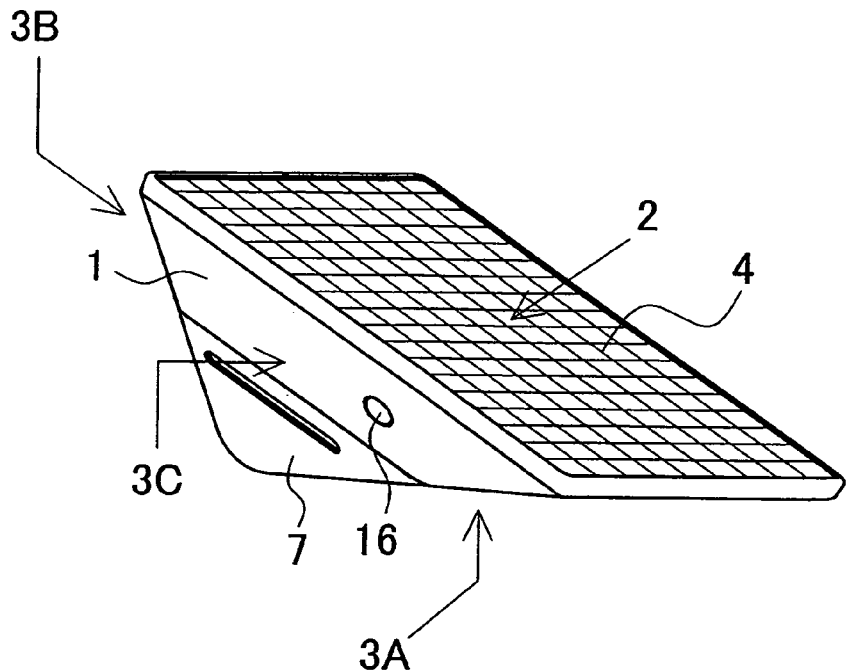
FIG. 2 is an oblique view of an embodiment of a solar charger of the present invention.
Figure 3:
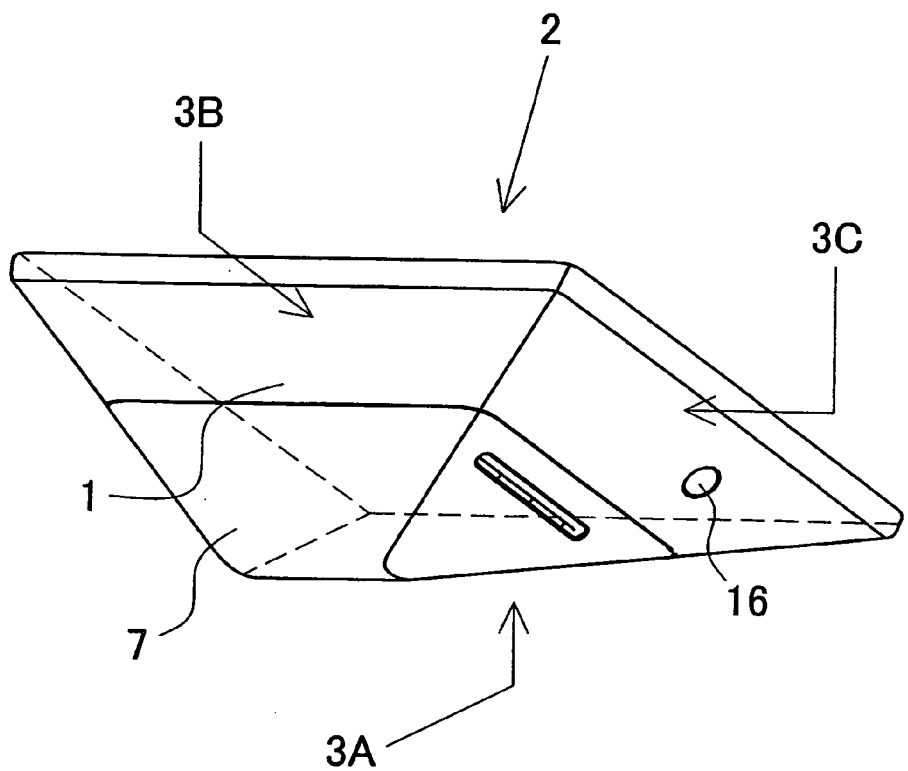
FIG. 3 is an oblique view from the backside of the solar charger shown in FIG. 2.
Figure 4:
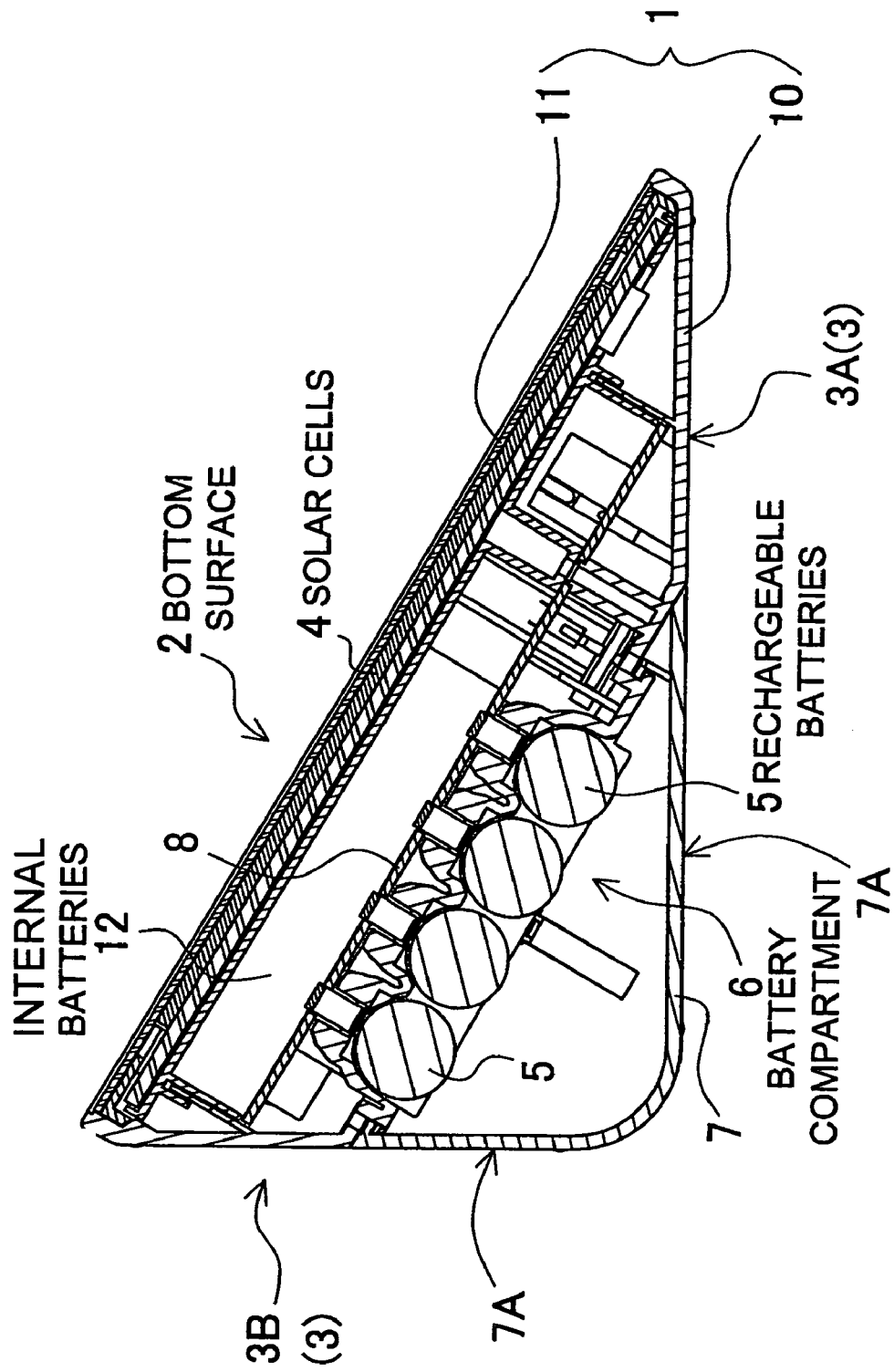
FIG. 4 is a vertical cross-section view of the solar charger shown in FIG. 2.
Figure 5:
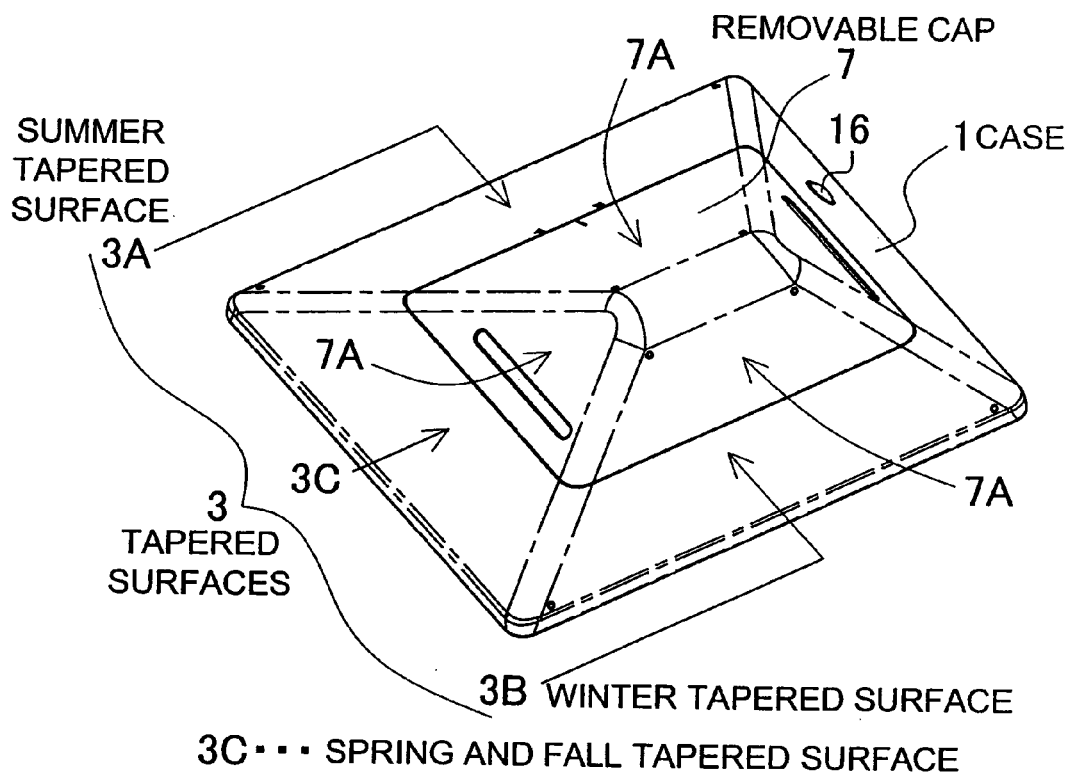
FIG. 5 is an oblique view from the tapered surface side of the solar charger shown in FIG. 2.

The solar charger (or solar re-charger) shown in FIGS. 2-10 is provided with a case 1 having a battery compartment 6 to hold rechargeable batteries 5 in a removable fashion, and solar cells 4 fixed to the case 1 to supply charging power to the rechargeable batteries 5.

The case 1 is formed in a shape that has a bottom surface 2 and at least two tapered surfaces 3 having different slope angles ($\alpha$) with respect to the bottom surface 2. The case 1 shown in FIGS. 2-7 has an overall pyramid-shape. The case 1 shown in FIGS. 2-7 is formed in a pyramid-shape having a polygonal bottom surface 2 with a plurality of tapered surfaces 3 at its perimeter. However, in the present application, a pyramid-shape is not necessarily limited to a shape having a vertex region that forms a vertex point opposite the bottom surface. For example, the case 1 shown in FIGS. 2-7 is not a perfect pyramid with four sides and a base, but rather the vertex region has a ridge that forms a rooftop-type pseudo-pyramid. Consequently, in the present application, the term pyramid-shape is used in the wider meaning to include various shapes, which have a polygonal bottom surface with gradually decreasing cross-sectional area towards the vertex region, such as a pseudo-pyramid with a ridge vertex region or with locally curved surfaces.

The case 1 is made of plastic and has solar cells 4, which are shaped as flat-plates, attached to the bottom surface 2. Since a polygonal bottom surface 2 can approximately maximize surface area, solar cells 4 attached there can be made large in area. As a result, the solar charger has the characteristic that output power is high and rechargeable batteries 5 can be charged in a short period. In particular, since the solar charger of the figures has a pyramid-shaped case 1, it can be set on a horizontal supporting surface 15 in a stable fashion via a tapered surface 3, while large solar cells 4 can be attached to the large area bottom surface 2. Solar cells 4 attached to the bottom surface 2 of the case 1 are made as large in area as possible to increase output. In the solar charger of the figures, solar cells 4 cover essentially the entire bottom surface 2 for high output.

Figure 8:
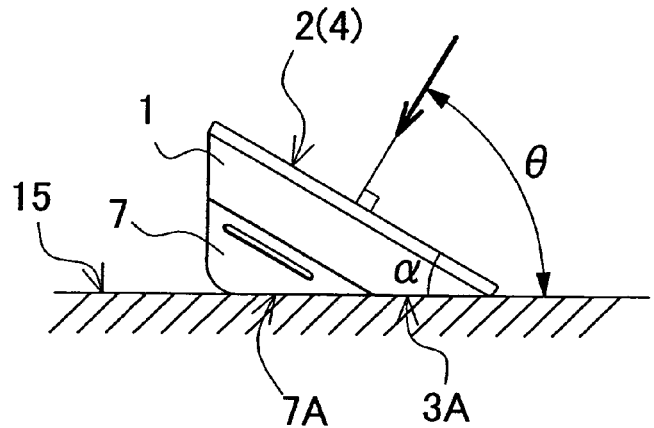
FIG. 8 is a side view showing one example of use of the solar charger shown in FIG. 2.
Figure 9:
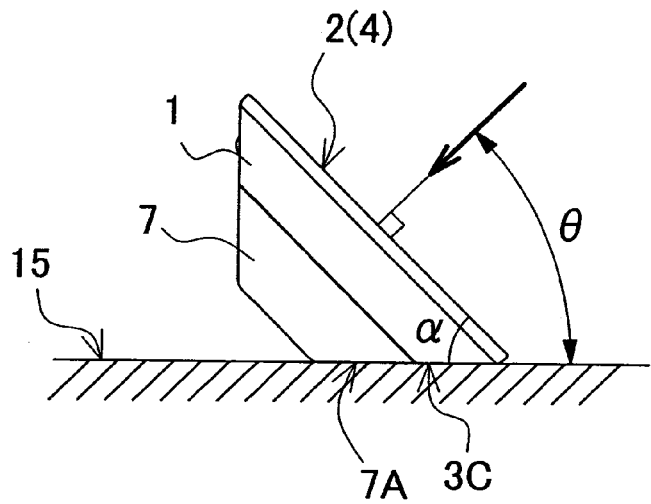
FIG. 9 is a side view showing another example of use of the solar charger shown in FIG. 2.
Figure 10:
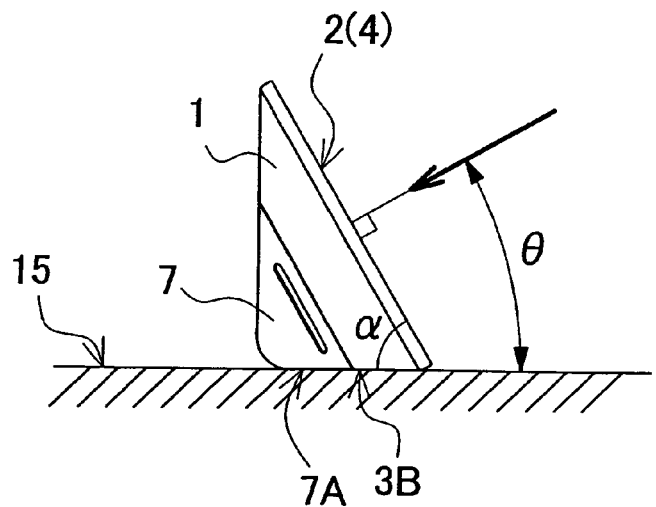
FIG. 10 is a side view showing another example of use of the solar charger shown in FIG. 2.
Figure 11:
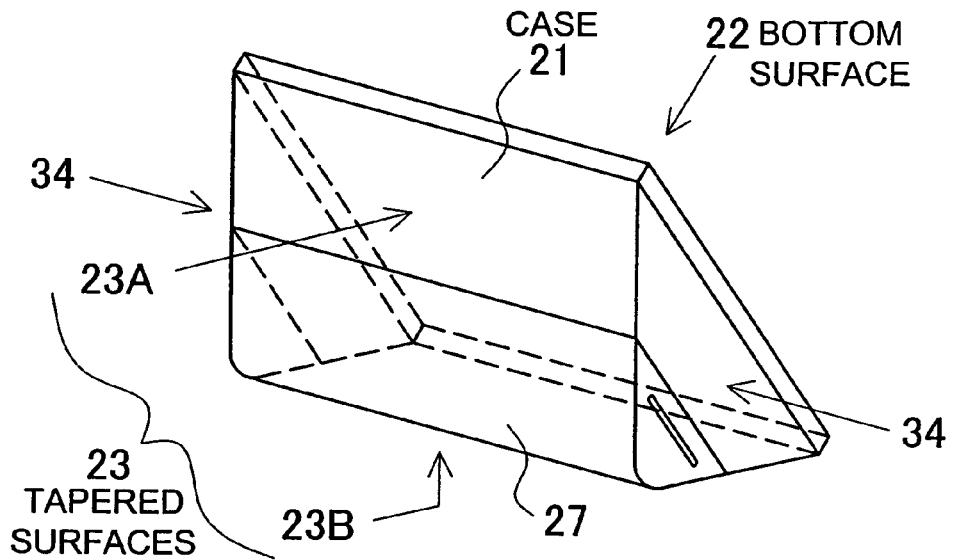
FIG. 11 is an oblique view of another embodiment of a solar charger of the present invention.
Figure 12:
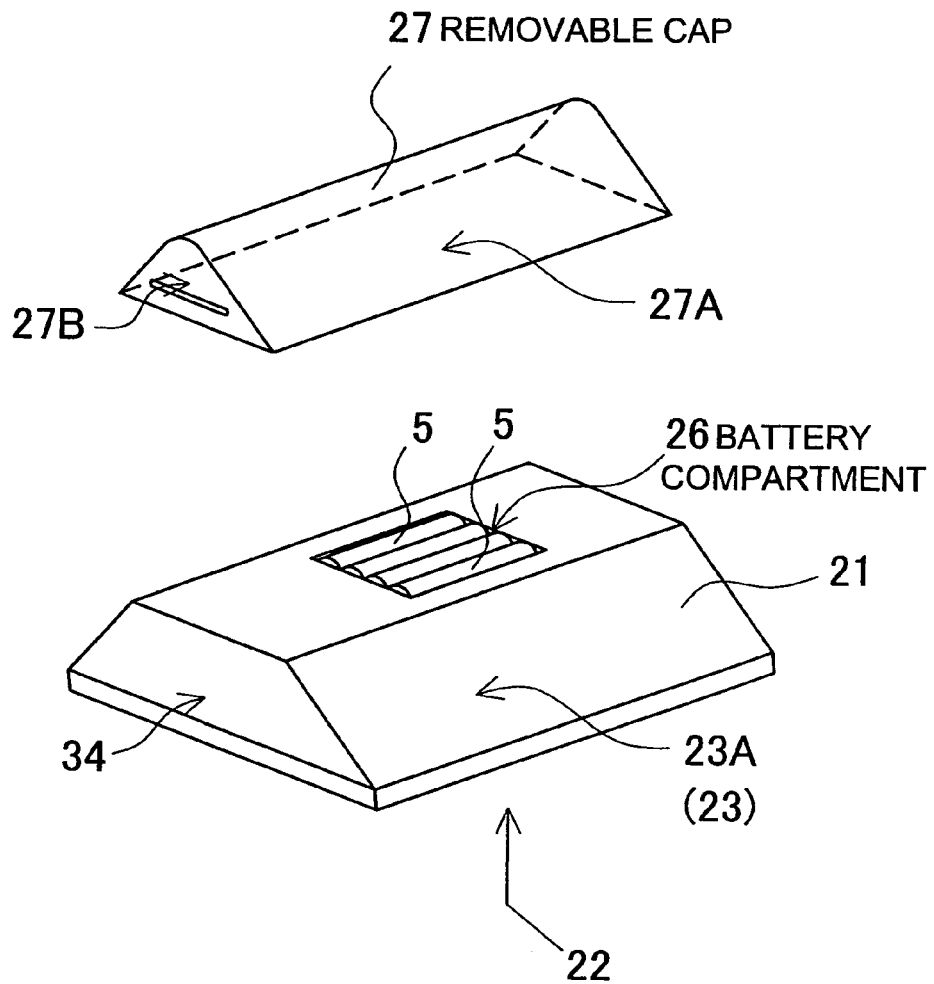
FIG. 12 is an exploded oblique view showing the battery compartment of the solar charger shown in FIG. 11.

Solar cells 4 can generate maximum output when the sun's rays shine perpendicular to the solar cells 4. Solar cell 4 angle of inclination, or more accurately the angle of inclination of a line perpendicular to the solar cells 4, is set by the slope angle ($\alpha$) between the tapered surface 3 placed on the horizontal supporting surface 15 and the bottom surface 2. Specifically, as shown in FIGS. 8-10, the slope angle ($\alpha$) of a tapered surface 3 can establish perpendicular irradiation of the solar cells 4 by the sun's rays according to the following.

Slope angle ($\alpha$)=90°−solar cell angle of inclination ($\theta$)

The angle of inclination of the sun's rays ($\theta$) varies over the four seasons of the year. The pyramid-shaped case 1 is provided with a plurality of tapered surfaces 3 having different slope angles ($\alpha$) with respect to the bottom surface 2 to adjust the angle of inclination (θ) of the solar cells 4 over the four seasons. The case 1 is provided with a summer tapered surface 3A having a solar cell angle of inclination for summer, a winter tapered surface 3B having a solar cell angle of inclination for winter, and a spring and fall tapered surface 3C having a solar cell angle of inclination for spring and fall. This allows the solar charger to point the solar cells 4 in the direction of the sun's rays over the four seasons of the year.

Incidentally, the elevation of the sun as it crosses the meridian varies with the season, and it varies with the latitude of the observer. For example, at a point in the northern hemisphere, the sun's angle of elevation at the meridian can be found from the following equations.

| | |
|---|---|
| spring and fall: | meridian elevation = 90° − north latitude |
| summer: | meridian elevation = 90° − north latitude + 23.4° |
| winter: | meridian elevation = 90° − north latitude − 23.4° |

Consequently, the solar charger can be most effectively irradiated by the sun as it crosses the meridian if the tapered surfaces 3 are established with the following slope angles (α).

| | |
|---|---|
| spring and fall: | slope angle (α) = north latitude |
| summer: | slope angle (α) = north latitude − 23.4° |
| winter: | slope angle (α) = north latitude + 23.4° |

Here, the sun's elevation as it crosses the meridian is the elevation of the sun at noon in that location. Therefore, in the time of day before and after noon, the sun's elevation is lower than its meridian elevation. Consequently, the slope angles (α) of the tapered surfaces 3 are made slightly greater (for example, approximately 1° to 15° greater) than indicated above for efficient average solar irradiation during the time of day before and after noon. Further, the summer solstice is the longest day of the year, and in the northern hemisphere, the sun's elevation at the meridian is highest of the year. Therefore, the sun's meridian elevation during the time of year before and after the summer solstice is lower than its meridian elevation at summer solstice. Consequently, the slope angle (α) of the summer tapered surface 3A is made slightly greater (for example, approximately 1° to 10° greater) than indicated above for efficient average solar irradiation during the time of year before and after summer solstice. In contrast, the winter solstice is the shortest day of the year, and in the northern hemisphere, the sun's elevation at the meridian is lowest of the year. Therefore, the sun's meridian elevation during the time of year before and after the winter solstice is higher than its meridian elevation at winter solstice. Consequently, the slope angle (α) of the winter tapered surface 3B is made slightly smaller (for example, approximately 1° to 10° smaller) than indicated above for efficient average solar irradiation during the time of year before and after winter solstice.

From the considerations above, the slope angle (α) of each tapered surface 3 of the solar charger can be set according to the following.

spring and fall tapered surface 3C slope angle (α)=from north latitude to north latitude+15° summer tapered surface 3A slope angle (α)=from north latitude−25° to north latitude winter tapered surface 3B slope angle (α)=from north latitude+15° to north latitude+30°

For example, at a north latitude of 35°, the slope angles (α) above can be established within the following ranges.

spring and fall tapered surface 3C slope angle (α)=35° to 50° summer tapered surface 3A slope angle (α)=10° to 35° winter tapered surface 3B slope angle (α)=50° to 65°

For the case 1 shown in FIGS. 8-10, the summer tapered surface 3A slope angle (α) is 30°, the spring and fall tapered surface 3C slope angle (α) is 45°, and the winter tapered surface 3B slope angle (α) is 60°.

For the solar charger described above, depending on the time of year, the tapered surface 3 placed on a horizontal supporting surface 15 can be changed to an optimum surface to efficiently irradiate the solar cells 4 with the sun's rays. For example, to obtain the optimum solar cell 4 angle of inclination (θ), the spring and fall tapered surface 3C is placed on the horizontal supporting surface 15 during the period of the year before and after the spring and fall equinoxes. The summer tapered surface 3A is placed on the horizontal supporting surface 15 during the period of the year before and after the summer solstice, and the winter tapered surface 3B is placed on the horizontal supporting surface 15 during the period of the year before and after the winter solstice. This placement method is extremely effective for shining the sun's rays into the solar cells 4 during the time of day before and after noon when the sun's elevation is highest.

The angle of inclination (θ) of the sun's rays also changes with time over the period of a day with the smallest angle at sunrise and sunset, and the largest angle when the sun crosses the meridian (approximately at noon). For a solar charger provided with a plurality of tapered surfaces 3 having different slope angles (α), the tapered surface 3 placed on the horizontal supporting surface 15 can be changed to an optimum surface for efficient irradiation of the solar cells 4 depending on the time of day. For example, during the time of year before and after the summer solstice and the time of day before and after noon (for example, from 10:00 am to 2:00 pm), an optimal solar cell 4 angle of inclination (θ) can be established by placing the summer tapered surface 3A on the horizontal supporting surface 15. During the morning and evening (for example, from 8:00 am to 10:00 am and from 2:00 pm to 4:00 pm), an optimal solar cell 4 angle of inclination (θ) can be established by placing the spring and fall tapered surface 3C on the horizontal supporting surface 15. This placement method is extremely effective for shining the sun's rays into the solar cells 4 over the period of a day.

The solar charger of the figures has a pyramid-shaped case 1 with four sides and a bottom surface. Here, the summer tapered surface 3A is provided opposite the winter tapered surface 3B, and the tapered surfaces 3 between the summer and winter tapered surfaces 3A, 3B are established as spring and fall tapered surfaces 3C. In this solar charger, there are four tapered surfaces 3, each tapered surface 3 can have a large surface area, and the bottom surface 2 can also have a large surface area to allow increased solar cell output as well as stable placement on a horizontal supporting surface 15. However, the solar charger of the present invention can have a pyramid-shaped case with three sides, which are a summer tapered surface, a winter tapered surface, and a spring and fall tapered surface, or it can also have a pyramid-shaped case with five or more sides. A pyramid-shaped case with four or more sides can be provided with tapered surfaces having still different slope angles (α) in addition to a summer tapered surface, a winter tapered surface, and a spring and fall tapered surface. This allows still more precise control of solar cell angle of inclination (θ) over the period of a year and over the period of a day.

The case can also have a shape as shown in FIGS. 11-19. The cases 21, 41 in these figures do not have an overall pyramid-shape, but rather have a prism-shape or a truncated prism-shape. These cases 21, 41 are provided with a rectangular bottom surface 22, 42, with two tapered surfaces 23, 43 and two vertical surfaces 34, 54 at the perimeter of the bottom surface 22, 42. The two tapered surfaces 23, 43 are on opposite sides, the two vertical surfaces 34, 54 are on opposite sides, and they are connected to opposite sides respectively of the rectangular bottom surface 22, 42. Specifically, the tapered surfaces 23, 43 are disposed between opposing vertical surfaces 34, 54. The two tapered surfaces 23, 43 are formed with different slope angles (α) with respect to the bottom surface 22, 42. The two vertical surfaces 34, 54 are connected at right angles to the bottom surface 22, 42. However, the vertical surfaces do not necessarily have to be at right angles to the bottom surface, and they may be sloped with respect to the bottom surface, or they may be curved surfaces, etc. In the cases 21, 41 shown in the figures, the tapered surfaces 23, 43 are connected to the long sides of the rectangular bottom surface 22, 42. Since the tapered surfaces 23, 43 of these types of cases 21, 41 can be made wide and large, they have the characteristic that they can be placed on a horizontal supporting surface 15 in a stable fashion.

Figure 13:
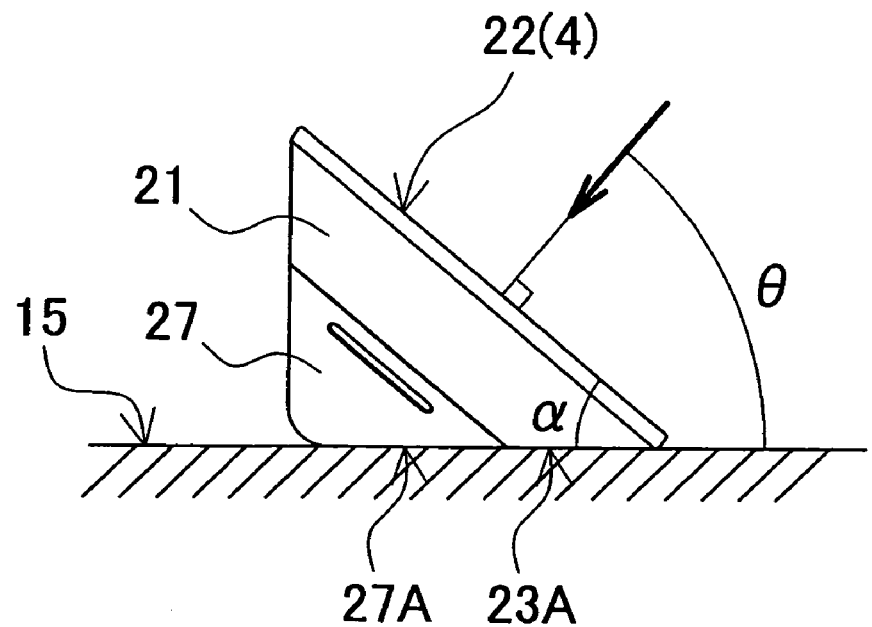
FIG. 13 is a side view showing one example of use of the solar charger shown in FIG. 11.
Figure 14:
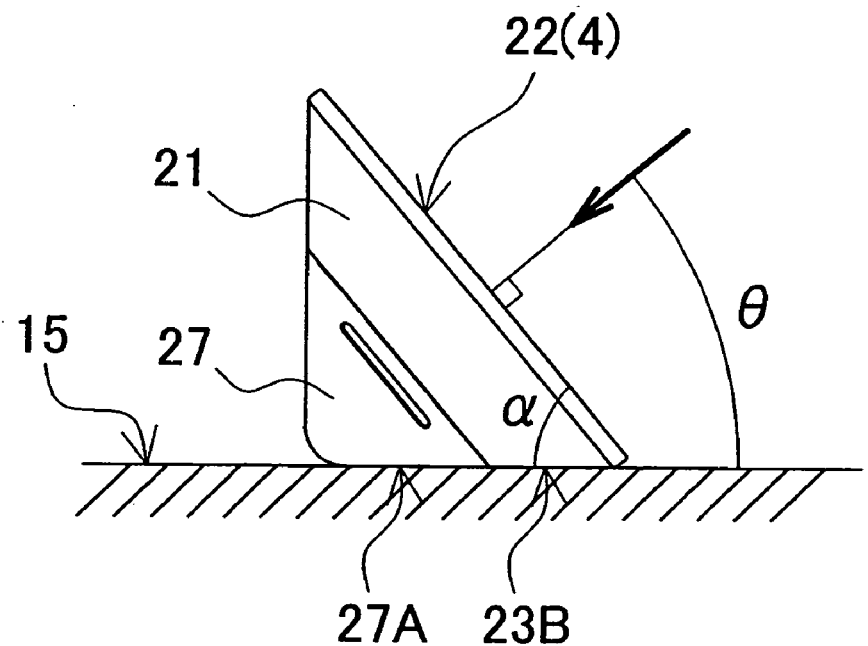
FIG. 14 is a side view showing another example of use of the solar charger shown in FIG. 11.
Figure 15:
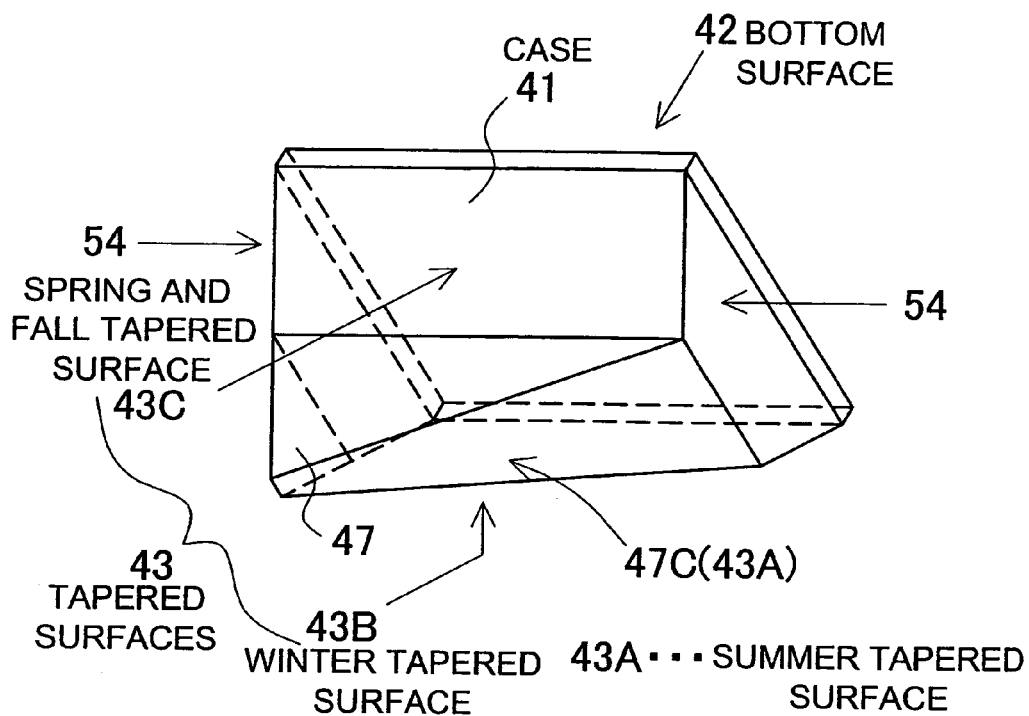
FIG. 15 is an oblique view of another embodiment of a solar charger of the present invention.
Figure 16:
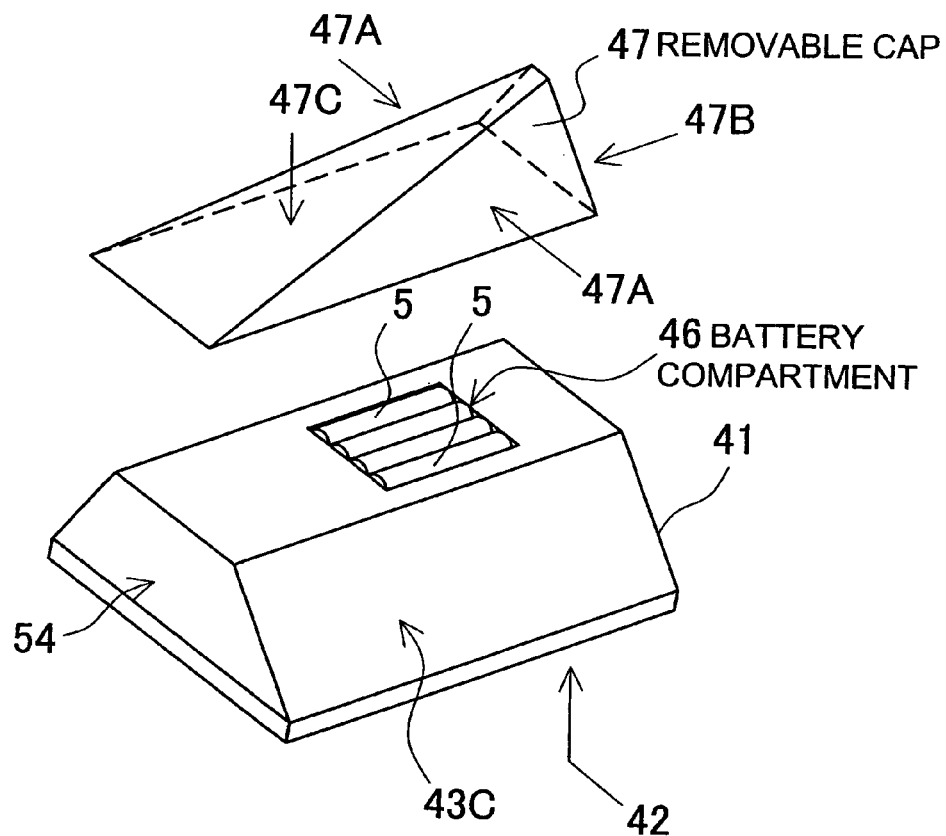
FIG. 16 is an exploded oblique view showing the battery compartment of the solar charger shown in FIG. 15.

The case 21 of FIGS. 11-14 has a summer tapered surface 23A and a winter tapered surface 23B as its two tapered surfaces 23. As shown in FIGS. 13 and 14, this case 21 is used in two orientations; with the summer tapered surface 23A placed on a horizontal supporting surface 15, and with the winter tapered surface 23B placed on the horizontal supporting surface 15. Specifically, this solar charger optimizes solar cell angle of inclination (θ) by placing the summer tapered surface 23A on the horizontal supporting surface 15 during a summer period between the spring equinox and the fall equinox, and by placing the winter tapered surface 23B on the horizontal supporting surface 15 during a winter period between the fall equinox and the spring equinox. This solar charger is not provided with a spring and fall tapered surface as in the previous embodiment. Therefore, the slope angles (α) of the summer tapered surface 23A and the winter tapered surface 23B are adjusted to optimize solar cell angle of inclination even at times of the year near the spring and fall equinoxes. The case 21 shown in FIGS. 11-14 has a summer tapered surface 23A slope angle (α) of 40°, and a winter tapered surface 23B slope angle (α) of 50°. However, the summer tapered surface and winter tapered surface provided on the case of this solar charger can also have slope angles (α) in the following range.

summer tapered surface 23A slope angle (α)=15° to 45° winter tapered surface 23B slope angle (α)=45° to 60°

Figure 17:
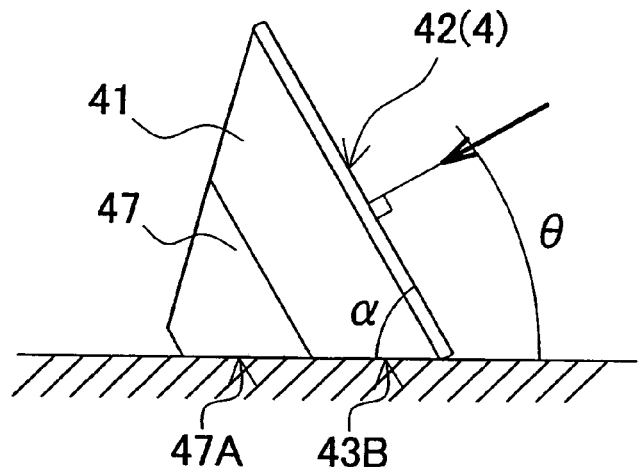
FIG. 17 is a side view showing one example of use of the solar charger shown in FIG. 15.
Figure 18:
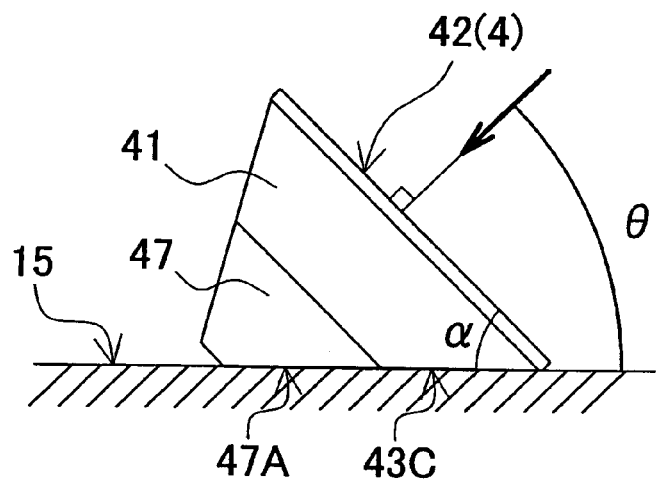
FIG. 18 is a side view showing another example of use of the solar charger shown in FIG. 15.
Figure 19:
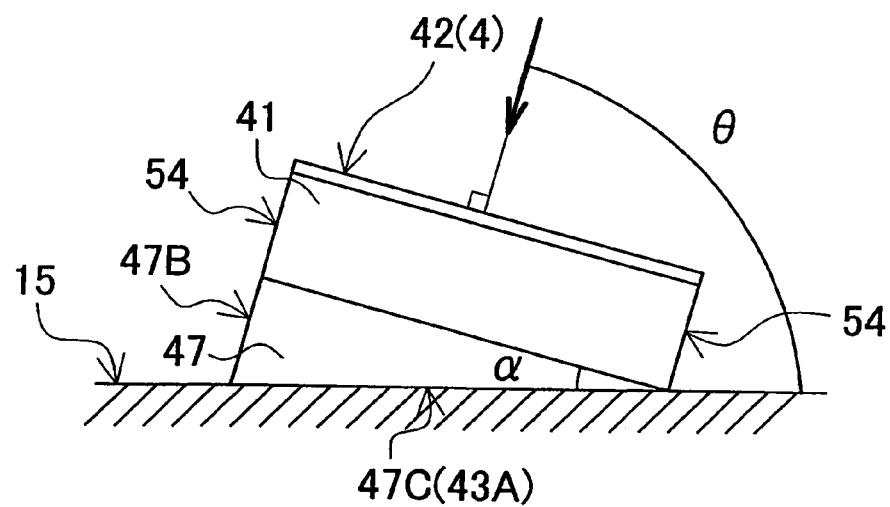
FIG. 19 is a side view showing another example of use of the solar charger shown in FIG. 15.

The case 41 of FIGS. 15-19 is provided with two tapered surfaces 43; a winter tapered surface 43B and a spring and fall tapered surface 43C. In addition, the vertex region of the case 41 serves as a tapered surface, which is a summer tapered surface 43A. As shown in FIGS. 17-19, depending on the season, the tapered surface 43 placed on the horizontal supporting surface 15 is changed to an optimum surface for efficient solar irradiation of the solar cells 4. Specifically, to obtain the optimum solar cell 4 angle of inclination (θ), the winter tapered surface 43B is placed on the horizontal supporting surface 15 during the period of the year before and after the winter solstice. The spring and fall tapered surface 43C is placed on the horizontal supporting surface 15 during the period of the year near the spring and fall equinoxes. The summer tapered surface 43A is placed on the horizontal supporting surface 15 during the period of the year near the summer solstice. The slope angles (α) of the tapered surfaces 43 of the case 41 shown in FIGS. 15-19 can be in the same range described previously for the embodiment shown in FIGS. 2-10. For the case 41 shown in FIGS. 17-19, the winter tapered surface 43B slope angle (α) is 60°, the spring and fall tapered surface 43C slope angle (α) is 45°, and the summer tapered surface 43A slope angle (α) is 15°.

Further, the cases 1, 21, 41 in the embodiments above are provided with rechargeable battery 5 compartments 6, 26, 46 in the vertex regions away from the bottom surfaces 2, 22, 42. For each of these cases 1, 21, 41, an opening at the battery compartment 6, 26, 46 is established by cutting the vertex region in a planar fashion parallel to the bottom surface 2, 22, 42. This opening is closed off by a removable cap 7, 27, 47. The removable cap 7, 27, 47 is attached in a manner that allows it to be attached and detached. Although not illustrated, alternatively, the rechargeable battery compartment can be provided in the removable cap-side of the solar charger.

The outer surfaces of the removable cap 7, 27, 47 have shapes that conform to the outer surfaces of the case 1, 21, 41. Specifically, the removable cap 7 shown in FIGS. 2-10 is provided with tapered surfaces 7A as its outer surfaces, and these tapered surfaces 7A form a pyramid-shape with sides that are coplanar with the tapered surfaces 3 of the case 1. The removable cap 27 shown in FIGS. 11-14 is provided with tapered surfaces 27A and vertical surfaces 27B, and has an overall triangular prism-shape. This removable cap 27 has tapered surfaces 27A in the same plane as the tapered surfaces 23 of the case 21, and has vertical surfaces 27B in the same plane as the vertical surfaces 34 of the case 21. The removable cap 47 shown in FIGS. 15-19 is provided with three tapered surfaces 47A, 47A, 47C and one vertical surface 47B, and has an overall pyramid-shape with four sides. The pyramid-shaped removable cap 47 has one vertical surface 47B in the same plane as the vertical surface 54 of the case 41, and it has its opposing tapered surfaces 47A, 47A in the same planes as the winter tapered surface 43B and the spring and fall tapered surface 43C of the case 41. In addition, the tapered surface 47C opposite the vertical surface 47B is not in the same plane as the vertical surface 54 of the case 41, but rather establishes a summer tapered surface 43A. When the removable cap 7, 27, 47 is attached to the case 1, 21, 41, the structure described above can put the tapered surfaces 7A, 27A, 47A of the removable cap 7, 27, 47 in the same planes as the tapered surfaces 3, 23, 43 of the case 1, 21, 41. As a result, when the removable cap 7, 27, 47 is attached to the case 1, 21, 41, a wide-area tapered surface 3, 23, 43 can be placed on a horizontal supporting surface 15 in a stable fashion. Further, since the tapered surface 47C provided on the removable cap 47 of the solar charger shown in FIGS. 15-19 establishes a wide-area summer tapered surface 43A opposite the bottom surface 42, it can be placed on a horizontal supporting surface 15 in a stable fashion.

A plurality of rechargeable batteries 5 are arranged parallel to one another and held in the battery compartment 6, 26, 46 of the case 1, 21, 41 in a plane parallel to the compartment opening. Four rechargeable batteries 5 are held in a parallel side-by-side fashion in the battery compartment of FIGS. 6, 12, and 16. The rechargeable batteries 5 are AA nickel hydride batteries or nickel cadmium batteries. However, the battery compartment can be configured to accept battery packs and batteries other than AA batteries. Further, all types of batteries that can be recharged, such as lithium ion rechargeable batteries, can also be used as the rechargeable batteries 5 set in the battery compartment 6, 26, 46.

Figure 7:
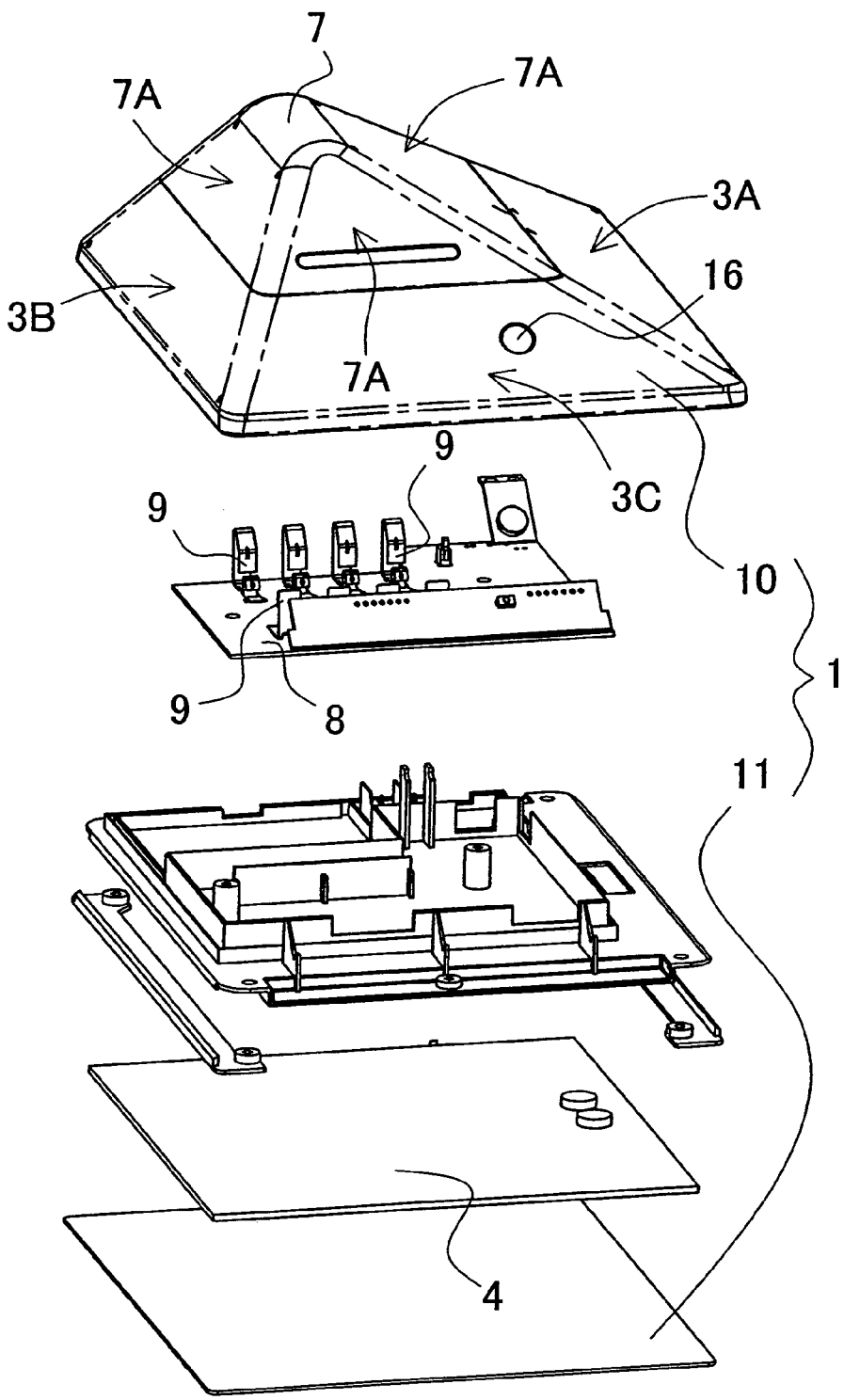
FIG. 7 is an exploded oblique view of the solar charger shown in FIG. 5.

A charging circuit to charge the rechargeable batteries 5 with output from the solar cells 4 is housed inside the case 1. Electronic parts to implement the charging circuit are mounted on a circuit board 8. Further, as shown in FIG. 7, charging terminals 9 that press in a flexible fashion and make electrical contact with the electrodes of the rechargeable batteries 5 set in the battery compartment 6 are mounted on the circuit board 8. The charging circuit detects full charge of the rechargeable batteries 5, and suspends charging when the rechargeable batteries 5 have reached full charge. Namely, solar cell 4 output is supplied to the rechargeable batteries 5 until full charge is reached. When the rechargeable batteries 5 are fully charged, solar cell 4 output is cut-off and rechargeable battery 5 charging is suspended.

The solar charger shown in the exploded oblique view of FIG. 7 has a case body 10 formed in a pyramid-shape with four-sides and an open bottom surface 2, and a separately formed rectangular closing plate 11 to close off the bottom surface 2 of the case body 10. Solar cells 4 are attached to the inside of the closing plate 11. Consequently, the closing plate is formed from a transparent material that can transmit sunlight to the solar cells 4, and is formed, for example, from clear plastic or glass. The case body 10 is formed from plastic. In addition, the circuit board 8 housing the charging circuit and charging terminals 9 is mounted inside the solar cells 4. The closing plate 11 is attached to the case body 10.

Figure 20:
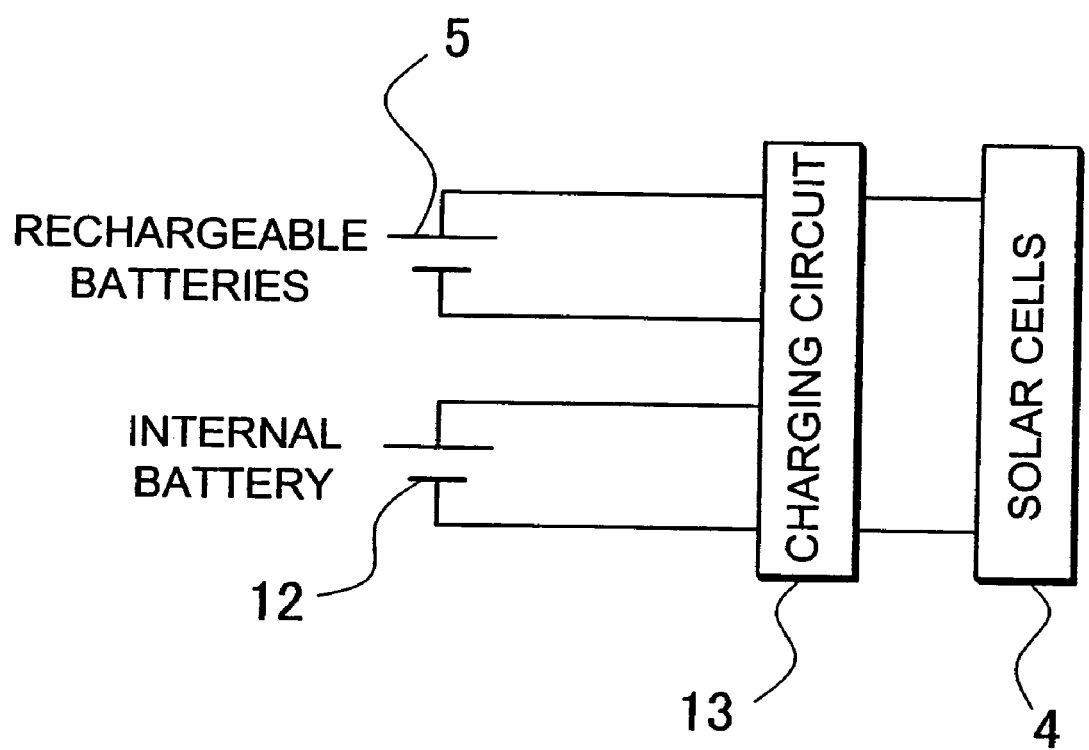
FIG. 20 is a circuit block diagram of an embodiment of a solar charger of the present invention.

FIG. 20 shows a circuit block diagram of the solar charger. This solar charger houses an internal battery 12 that cannot be removed. The solar charger shown in FIG. 4 has a solid rectangular shaped battery mounted inside the case 1 as an internal battery 12. The internal battery 12 is a lithium ion rechargeable battery that is charged by the solar cells 4. A solar charger with a lithium ion rechargeable battery as its internal battery 12 can efficiently charge the internal battery 12. In particular, compared to a nickel hydride battery or nickel cadmium battery, a lithium ion rechargeable battery is more efficiently charged even when solar cells 4 are in a low output state. Therefore, even when the solar cells 4 do not receive sufficient light, the internal battery 12 can be efficiently charged over time. In almost all cases, the solar charger charges rechargeable batteries 5 only over limited time periods. Namely, most of the time the solar charger is not used to charge rechargeable batteries 5, and only charges rechargeable batteries 5 at critical times. Since the internal battery 12 can be charged during long periods when rechargeable batteries 5 are not being charged, even a large capacity internal battery 12 can be sufficiently charged to full charge when rechargeable batteries 5 are not being charged.

The internal battery 12 is charged when the solar cells 4 are outputting power and when no rechargeable batteries are inserted, or when the rechargeable batteries 5 have been fully charged. The charging circuit 13 detects internal battery 12 full charge and suspends charging. When the internal battery 12 is fully charged and rechargeable batteries 5 are loaded, the rechargeable batteries 5 are charged by both the solar cells 4 and the internal battery 12. Here, the charging circuit 13 charges the rechargeable batteries 5, and controls charging to avoid over-discharging the internal battery 12. Consequently, when there is no more remaining capacity in the internal battery 12, rechargeable battery 5 charging from the internal battery 12 is suspended even when rechargeable batteries 5 have not reached full charge. Since a solar charger provided with an internal battery 12 can charge rechargeable batteries 5 via both solar cells 4 and the internal battery 12, it can fully charge rechargeable batteries 5 in a short time period compared to charging only with solar cells 4. Further, even when no output is obtained from the solar cells 4, rechargeable batteries 5 can be charged by the internal battery 12. A solar charger with an internal battery 12 having a capacity capable of fully charging all the rechargeable batteries 5 loaded in the battery compartment 6 can fully charge the rechargeable batteries 5 with the internal battery 12 when no output is available from the solar cells 4. Since the internal battery 12 is charged over long periods, the probability that the internal battery 12 is fully charged is quite high and rechargeable batteries 5 are efficiently charged when they are loaded for charging.

The case 1 shown in FIGS. 2-10 is provided with a circular opening through a tapered surface 3, and a push-button 16 is provided there. By pressing the push-button 16, a display of lighted or blinking light emitting diodes (LEDs), etc. can indicate the charge capacity, which is remaining battery capacity, and the charging state (charging in progress or charging complete) of the internal battery 12, and the remaining battery capacity and the charging state (charging in progress or charging complete) of each rechargeable battery 5. Here, by disposing LEDs inside a case 1 made from transparent material, for example, translucent resin material, LED light can be read from outside the case 1. However, a display window can also be opened through the case to shine LED light through the window to the outside.

Figure 6:
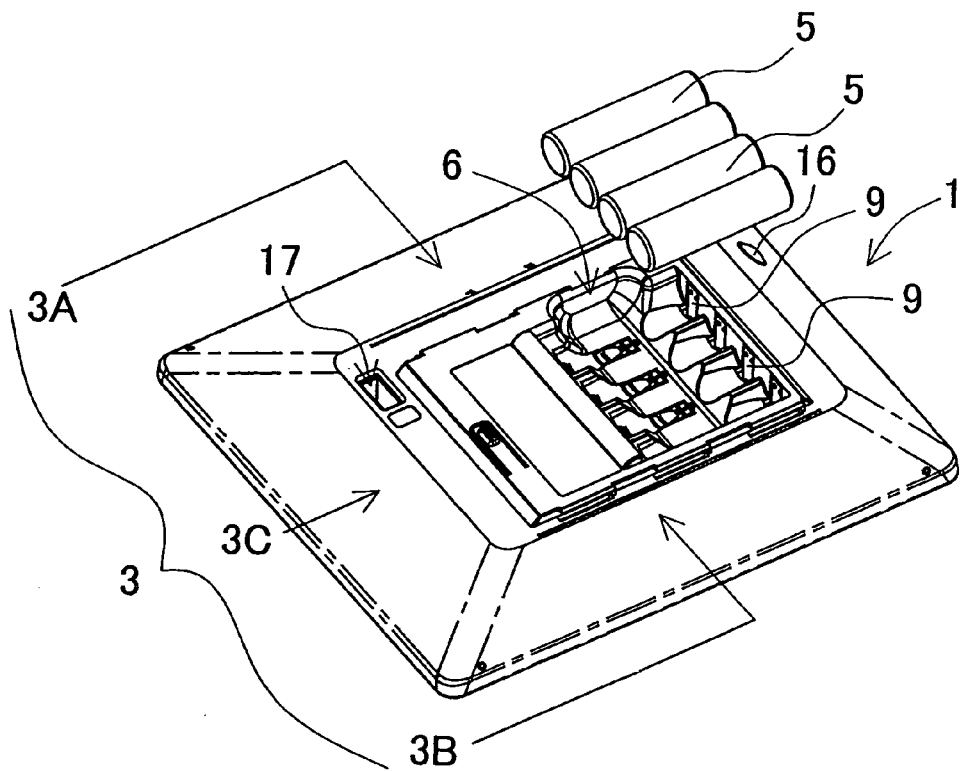
FIG. 6 is an oblique view showing the battery compartment of the solar charger shown in FIG. 5.

Finally, as disclosed in FIG. 6, the present embodiment can be provided with a rectangular USB terminal 17, and electronic equipment provided with a USB connector or electronic equipment that can be connected via a USB cable can be attached or connected to the solar charger. As a result, output from the solar cells 4 or the internal battery 12 can be supplied to electronic equipment via USB connection.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-282382 filed in Japan on Oct. 17, 2006, the content of which is incorporated herein by reference.

What is claimed is:

1. A solar charger comprising:
   a rechargeable battery;
   a case having a bottom surface and at least two tapered surfaces having different slope angles with respect to the bottom surface, the case holding the rechargeable battery in a removable fashion; and
   a solar cell, disposed on the bottom surface, for supplying charging power to the rechargeable battery loaded in the case, wherein
   an angle of inclination of the solar cell provided on the bottom surface can be changed by disposing one of the tapered surfaces having different slope angles on a flat surface,
   the case is provided with at least a summer tapered surface, having n angle of inclination for summer, and a winter tapered surface having an angle of inclination for winter.

2. The solar charger as recited in claim 1, wherein the case is formed in the shape of a pyramid or a hipped roof with a polygonal bottom surface and a plurality of tapered surfaces around a perimeter of the bottom surface.

3. The solar charger as recited in claim 2, wherein the pyramid or hipped roof shape has a polygonal bottom surface and a cross-section surface area that decreases towards the vertex region.

4. The solar charger as recited in claim 2, wherein the case is formed in a pyramid or hipped roof shape with four sides around the bottom surface.

5. The solar charger as recited in claim 1, wherein a rechargeable battery compartment is provided in a vertex region of the case opposite from the bottom surface.

6. The solar charger as recited in claim 5, wherein
the vertex region of the case is cut in a planar fashion to form an opening for the rechargeable battery compartment;
a removable cap closes off the opening; and
the removable cap has a shape that is coplanar with the tapered surfaces of the case.

7. The solar charger as recited in claim 1, wherein the case is also provided with a spring and fall tapered surface having an angle of inclination for spring and fall.

8. The solar charger as recited in claim 7, wherein
the spring and fall tapered surface has a slope angle equal to a north latitude at a point of use,
the summer tapered surface has a slope angle equal to a sum of the north latitude at the point of use minus 23.4°, and
the winter tapered surface has a slope angle equal to the sum of the north latitude at the point of use plus 23.40°.

9. The solar charger as recited in claim 7, wherein
the spring and fall tapered surface has a slope angle ranging from a north latitude at a point of use to the north latitude at a point of use plus 15°,
the summer tapered surface has a slope angle ranging from the north latitude at the point of use to the north latitude at a point of use minus 25°, and
the winter tapered surface has a slope angle ranging from the north latitude at the point of use plus 15° to the north latitude at a point of use plus 30°.

10. The solar charger as recited in claim 7, wherein
the spring and fall tapered surface has a slope angle from 35° to 50°,
the summer tapered surface has a slope angle from 10° to 35°, and
the winter tapered surface has a slope angle from 50° to 65°.

11. The solar charger as recited in claim 1, wherein the case is formed in a prism or a truncated prism shape, having a bottom surface with a rectangular shape, and two tapered surfaces provided at the perimeter of the bottom surface.

12. The solar charger as recited in claim 1, wherein the summer tapered surface has a slope angle of 40°, and the winter tapered surface has a slope angle of 50°.

13. The solar charger as recited in claim 1, wherein the summer tapered surface has a slope angle ranging from 15° to 45°, and the winter tapered surface has a slope angle ranging from 45° to 60°.

14. The solar charger as recited in claim 1, wherein the case is also provided spring and fall tapered surface, and
a vertex region of the case serves as a third tapered surface, which is the summer tapered surface.

15. The solar charger as recited in claim 14, wherein
the spring and fall tapered surface has a slope angle ranging from 35° to 50°,
the summer tapered surface has a slope angle ranging from 10° to 35°, and
the winter tapered surface has a slope angle ranging from 50° to 65°.

16. The solar charger as recited in claim 1, wherein
an internal battery, which is charged by the solar cell, is provided inside the case, and
the rechargeable battery is charged with the internal battery.

17. The solar charger as recited in claim 16, wherein the internal battery is a lithium ion rechargeable battery.

18. The solar charger as recited in claim 1, wherein the case houses a charging circuit to charge the rechargeable battery with output from the solar cell.

19. The solar charger as recited in claim 18, wherein
an internal battery, which is charged by the solar cell, is provided inside the case, and
the charging circuit charges the rechargeable battery using both the solar cell and the internal battery.

20. A solar charger as recited in claim 1 wherein the case includes
an internal battery, which is charged by the solar cell,
a push-button, and
LEDs to indicate the remaining battery capacity and the charging state of the internal battery, and the remaining battery capacity and the charging state of the rechargeable battery, when the push-button is pressed.

21. The solar charger as recited in claim 20, wherein the case is made of a material that passes light and the LEDs are disposed inside the case.

22. The solar charger as recited in claim 1, wherein the case is provided with a USB terminal, and power is supplied, to electronic equipment provided with a USB connector, via a connection to the USB terminal.

\* \* \* \* \*